(No Model.)
D. PEPPER, Jr.
ARMATURE RING.
No. 473,078. Patented Apr. 19, 1892.
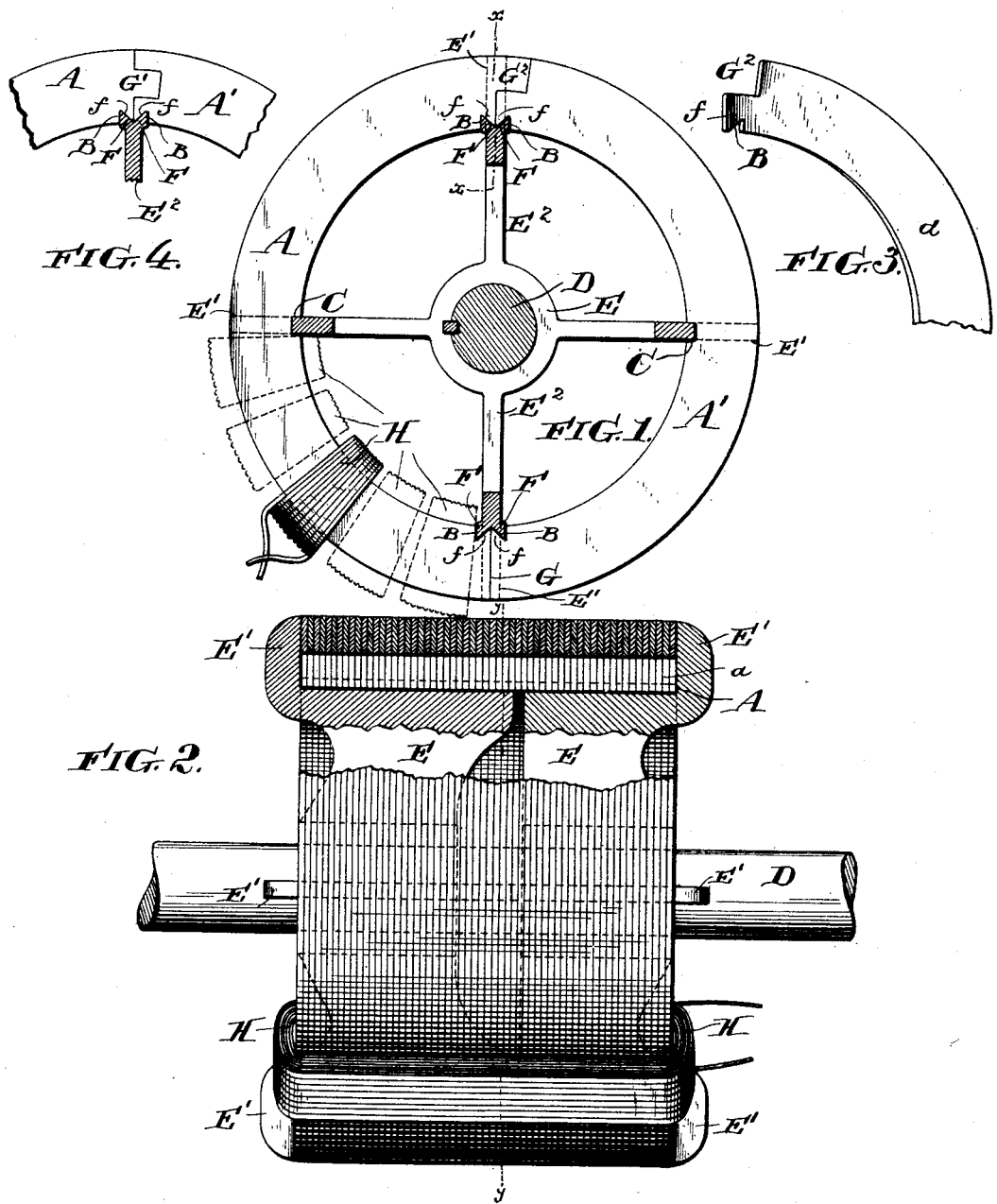

UNITED STATES PATENT OFFICE.

DAVID PEPPER, JR., OF PHILADELPHIA, PENNSYLVANIA.

ARMATURE-RING.

SPECIFICATION forming part of Letters Patent No. 473,078, dated April 19, 1892.

Application filed December 3, 1891. Serial No. 413,870. (No model.)

*To all whom it may concern:*

Be it known that I, DAVID PEPPER, Jr., of the city of Philadelphia, county of Philadelphia and State of Pennsylvania, have invented a certain new and useful Armature-Ring, of which the following is a true and exact description, reference being had to the drawings accompanying this specification.

My invention relates to the construction of sectional armature-rings for motors and dynamos, and has for its object to secure the abutting ring-sections together in a convenient and efficient manner.

The nature of my invention will be best understood as described in connection with the drawings, in which it is illustrated, and in which—

Figure 1 is a side view of the sectional ring, the armature-shaft, and the spider, the spider being shown in section on the line Y Y of Fig. 2. Fig. 2 is a front elevation, partly in section, on the line X X of Fig. 1. Fig. 3 is a perspective view of part of one of the thin plates of which the ring is preferably constructed, and Fig. 4 a view showing a slight modification in the way of securing the ring-sections together.

A A indicate two ring-sections, each of which is preferably made up of a number of thin plates, such as are indicated at Fig. 3. The ends of each ring-section are made so as to fit against the ends of the abutting ring-section. The shape of the joint may be varied at will.

I have illustrated at G, Fig. 1, a joint formed by the meeting of two plain surfaces; at $G^2$, Fig. 1, a joint formed by lapping tongues, and at G', Fig. 4, still another form of lap-joint. In all cases, however, I form on the inside of the ring-section and close to its end a groove B, lying inside of a tongue $f$, which tongue is preferably of the wedge form indicated in the drawings.

D indicates the armature-shaft to which the spiders E E are keyed. These spiders are provided with fingers E', which grasp the ring, as shown, and the arm $E^2$ extends out so as to come in contact with the inner edge of each joint formed by two abutting ring sections. On the end of each such arm $E^2$, I form fingers F F, corresponding in shape and position with the grooves B B on the abutting ring-sections. The fingers enter the grooves and, resting against the tongues $ff$, effectually lock the ring-sections together. The tongue $f$ should have the wedge shape shown, so that the pressure of the fingers upon them will tend to press or wedge the two abutting ends closely together. $h\,h$, &c., indicate coils which are placed upon the ring-sections in the usual way.

It will be noted that in my construction the ring-sections are locked together by the sole action of the spider, which, owing to its form and this mode of construction and engaging the ring-sections, will effectually prevent any movement of one section independent of the other. I am thus enabled to dispense with locking pins or clamps and to secure the parts of the ring together irrespective of the form of the joint.

Having now described my invention, what I claim as new, and desire to secure by Letters Patent, is—

1. In an armature-ring, the combination of core-sections meeting end to end and each having near its ends grooves, as B, formed in the inner face of the sections, with a spider, the arms E of which have fingers F F formed to enter the grooves B B of abutting sections and lock said sections together.

2. In an armature-ring, the combination of core-sections meeting end to end and each having near its ends grooves, as B, formed in the inner face of the sections, so as to have wedges $f$ between the groove and the section end, with a spider, the arms E of which have fingers F F formed to enter the grooves B B of abutting sections and to rest on wedges $f\,f$, all substantially as and for the purpose specified.

DAVID PEPPER, JR.

Witnesses:
LEWIS R. DICK,
J. H. RUSSELL.